United States Patent

Lin et al.

[15] 3,642,585

[45] Feb. 15, 1972

[54] DOUBLE-DIP PROCESS FOR METAL PLATING OF SUBSTRATES

[72] Inventors: Kingso C. Lin, Niagara Falls; Edward J. Quinn, Tonawanda, both of N.Y.; John K. MacKay, Niagara Falls, Ontario, Canada

[73] Assignee: Hooker Chemical Corporation, Niagara Falls, N.Y.

[22] Filed: July 15, 1969

[21] Appl. No.: 841,992

[52] U.S. Cl. ..........204/30, 117/47 A

[51] Int. Cl. ..........C23b 5/60

[58] Field of Search..........204/30; 117/47 A, 160, 71; 23/223; 106/287

OTHER PUBLICATIONS

Wein, S., Metallizing Non-Conductors N.Y., Metal Industry Pub. Co., 1945, p. 39

*Primary Examiner*—John H. Mack
*Assistant Examiner*—R. J. Fay
*Attorney*—Peter F. Casella, Donald C. Studley, Richard P. Mueller, James F. Mudd and William J. Crosetta, Jr.

[57] ABSTRACT

There is provided an improved process for the metal plating of substrates which comprises contacting a substrate with a solution of phosphorus in an organic solvent having a layer on the surface thereof of water and/or a surfactant to deposit phosphorus at the surface of the substrate; exposing said substrate to the atmosphere for a period of time sufficient to oxidize a portion of said phosphorus; returning said substrate to the layer of water and/or surfactant; and thereafter contacting said substrate with a metal salt or complex thereof so as to form a metal phosphide. The resulting treated substrate can be electroless plated and/or electroplated by conventional techniques.

14 Claims, No Drawings

DOUBLE-DIP PROCESS FOR METAL PLATING OF SUBSTRATES

BACKGROUND OF THE INVENTION

There is a rapidly increasing demand for metal plated articles, for example, in the production of low cost plastic articles that have a simulated metal appearance. Such articles are in demand in such industries as automotive, home appliance, radio and television and for use in decorative containers and the like.

It is an object of the invention to provide an improved process for the metal plating of plastics. Another object of the invention is to provide an improved process that is applicable to plating of many different substrates, particularly the thermoplastic polymers. A further object of the invention is to provide substrates having improved adhesion and thermocyclic properties. The process of this invention can be used for unidirectional mirrors and the like; water and liquid-collecting devices and the like; protective coatings on houses, cars, boats, power line poles, street lights and the like; in thermal control of clothing, houses and the like; and the like.

SUMMARY OF THE INVENTION

This invention provides an improved process for forming a metal phosphide at the surface of a substrate. More particularly, this invention relates to a process which comprises contacting a substrate with a solution of phosphorus in an organic solvent having a layer on the surface thereof of water and/or a surfactant to deposit phosphorus at the surface of the substrate; exposing said substrate to the atmosphere for a period of time sufficient to oxidize a portion of said phosphorus; returning said substrate to the layer of water and/or surfactant; and thereafter contacting said substrate with a metal salt or complex thereof so as to form a metal phosphide. The resulting treated substrate can be electroless plated and/or electroplated by conventional techniques.

DESCRIPTION OF THE PREFERRED EMBODIMENT

An article having a metal phosphide adherently formed at the surface of the substrate is provided in accordance with the process of copending application Ser. No. 759,531, filed Aug. 2, 1968. That process is applicable to substrates, such as plastics and to other substantially nonmetallic substrates. Suitable substrates include, but are not limited to, cellulosic and ceramic materials such as cloth, paper, wood, cork, cardboard, clay, porcelain, leather, porous glass, asbestos, cement, and the like.

Typical plastics to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene, polyisoprene, polystyrene and polymers of pentene, hexene, cyclopentadiene, methylstyrene, and the like. Other polymers useful in the invention include chlorinated polypropylene and methylene; polyindene, indenecoumarone resins; polymers of acrylate esters and polymers of methacrylate esters, acrylate and methacrylate resins such as ethyl acrylate; alkyd resins; cellulose derivative such as cellulose acetate; cellulose acetate butyrate, cellulose nitrate, ethyl cellulose; epoxy resins; furan resins (furfuryl alcohol or furfural ketone); hydrocarbon resins from petroleum, isobutylene resins (polyisobutylene); isocyanate resins (polyurethanes); melamine resins such as melamine-formaldehyde; oleo-resins; phenolic resins such as phenolformaldehyde; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde; rubbers such as natural rubber, synthetic polyisoprene reclaimed rubber, chlorinated rubber, polybutadiene; polysulfides (Thiokol); terpene resins; urea resins; vinyl resins such as polymers of vinyl acetal; polyvinylchloride; polyformaldehyde; polyphenylene oxide; polymers of diallylphthalates and phthalates; polycarbonates of phosgene or thiophosgene and dihydroxy compounds such as bisphenols, thermoplastic polymers of bisphenols and epichlorohydrin (trade named Phenoxy polymers); graft copolymers and polymers of unsaturated hydrocarbons and an unsaturated monomer, such as graft copolymers of polybutadiene, styrene and acrylonitrile, commonly called ABS resin; ABS-polyvinylchloride polymers, recently introduced under the trade name of Cycovin; and acrylic polyvinyl chloride polymers, known by the trade name of Kydex 100.

The polymers can be used in the unfilled condition, or with fillers such as glass fiber, glass powder, glass beads, asbestos, talc and other mineral fillers, wood flour and other vegetable fillers, carbon in its various forms, dyes, pigments, waxes and the like.

The substrates can be in various physical forms, such as shaped articles, for example, moldings, sheets, rods, and the like; fibers, films, and fabrics, and the like and of various thickness.

In the first step of the preferred process of Ser. No. 759,531, the substrate is subjected to elemental white phosphorus, which includes the various impure or commercial grades sometimes referred to as yellow phosphorus. The phosphorus is utilized dissolved in a solvent. Suitable solvents or diluents for the elemental phosphorus are solvents that dissolve elemental phosphorus and which preferably swell the surface of a plastic without detrimentally affecting the surface of the plastic. Such solvents include the halogenated hydrocarbons and halocarbons such as chloroform, methyl chloroform, phenyl chloroform, dichloroethylene, trichloroethylene, perchloroethylene, trichloroethane, dichloropropane, ethyl dibromide, propylene dibromide, monochlorobenzene, monochlorotoluene, and the like; aromatic hydrocarbons such as benzene, toluene, xylene, ethyl benzene, naphthalene and the like. Mixtures of any of the foregoing solvents can be employed. The solution concentration is generally in the range from about 0.0001 weight percent of phosphorus based on the weight of the solution up to a saturated solution and preferably from about 0.1 to about 2.5 percent. Prior to subjecting the substrate to the elemental phosphorus, the surface of the article should be clean. The solvent of the solution will generally serve to clean the surface. A solvent wash may be desirable when gaseous or liquid phosphorus is employed. However, it is not necessary to subject the substrate to special treatment such as etching, polishing and the like. The phosphorus treatment is generally conducted at a temperature below the softening point of the substrate, and below the boiling point of the solvent. Generally, the temperature is in the range of about 10° to about 100° centigrade. The contact time varies depending on the nature of the substrate, the solvent and temperature, but is generally in the range of about 1 second to 1 hour or more, preferably in the range of about 1 to 10 minutes.

The phosphorus solution is provided with an upper layer or phase of water or a surfactant. The thickness of the upper layer is generally at least about 0.25 inch and is preferably at least about 1 inch. The thickness can be as great as 1.5 to 5 inches, as great as the depth of the phosphorus-organic solvent layer, or an even greater depth. The temperature of the aqueous phase is generally maintained in the range of about 30° to 100° centigrade, preferably in the range of about 30° to 80° centigrade. These temperatures are generally maintained by contact with the organic solvent phase beneath the aqueous phase. The liquid surfactant is generally used in a nondiluted form, however, an aqueous solution in a concentration in the range of about 1 to about 99 parts by weight of surfactant per 100 parts of total solution, preferably in the range from about 10 to 90 parts by weight of surfactant per 100 parts of total solution, can be employed.

The surfactants employed include the anionic, cationic, and nonionic surfactants. Typical of useful compounds are alcohols such as the monohydric aliphatic alcohols, for example, ethanol, butanol, hexanol, nacconol, and the like; dihydric aliphatic alcohols, for example, ethylene glycol, diethylene glycol, propylene glycol, dipropylene glycol, and other alkylene glycols. Higher alcohols, such as glycerol, are also useful. Other suitable surfactants include the phosphate, carbonate, bicarbonate, hydroxide, sulfate and acid sulfate salts of alkali metals and quaternary nitrogen. Thus, the corresponding compounds of lithium, sodium, potassium, rubidium, cesium, franconium, and $NH_4^+$ can be employed. Suitable nonionic surfactants include the alkylphenoxypoly(ethyleneoxy)ethanols, and the dialkylphenoxypoly(ethyleneoxy)ethanols, preferably those wherein the alkyl substituent has five to 12 carbon atoms and which have one to 20 ethyleneoxy groups. Typical members are octylphenoxypoly(ethyleneoxy)ethanol, nonylphenoxypoly(ethyleneoxy)ethanol and dodecylphenoxypoly(ethyleneoxy)ethanol. Also useful are the fatty acid esters of polyhydric alcohols or ether alcohols, for example, glycerol monostearate; esters of ethylene glycol, diethylene glycol, triethylene glycol and polyethylene glycol, for example, the condensation product of oleic acid with ethylene oxide; and fatty esters of sugar alcohols. Suitable anionic surfactants include the alkali metal alkylbenzene sulfonates, particularly those wherein the alkali metal is sodium or potassium and the alkyl group has eight to 20 carbon atoms. Typical members are sodium dodecylbenzene sulfonate and potassium dodecylbenzene sulfonate. Another suitable group of anionic surfactants is the alkali metal alkyl sulfates, particularly those wherein the alkali metal is sodium or potassium and the alkyl group has eight to 20 carbon atoms. A typical member is sodium lauryl sulfate. Also useful are the sulfonated aliphatic polyesters, free acids of complex phosphate esters, sodium salts of complex phosphate esters and sodium salt of disproportionated wood rosin. Another suitable group of anionic surfactants is the alkali metal lignin sulfonates, such as sodium lignin sulfonate and potassium lignin sulfonate. Suitable cationic surfactants include the fatty amides of monoethanolamines; fatty nitriles and fatty acid amides, such as olein morpholide. Also useful are cationic agents such as N-coco-B-amino buteric acid, dicoco dimethyl ammonium chloride and polyoxyethylated alkylamines. Especially preferred surfactants for use in this aspect of the invention are the alkyl amides of the formula:

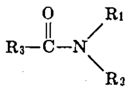

wherein $R_1$ and $R_2$ are independently selected from the group consisting of hydrogen and alkyl, and $R_3$ is selected from the group consisting of hydrogen, alkyl and $—NR_1R_2$. The alkyl groups can have one to about 12 carbon atoms, preferably one to about six carbon atoms. Typical amides that can be used in the practice of the invention include: formamide, ethylformamide, propylformamide, hexylformamide, dimethylformamide, diethylformamide, dipropylformamide, acetamide, ethylacetamide, isopropylacetamide, hexylacetamide, dimethylacetamide, diethylacetamide, and the like. Mixtures of any of the foregoing surfactants can also be employed.

As a result of the first treatment step, the phosphorus is deposited or nucleated at the surface of the substrate. By this is meant that the phosphorus can be located on the surface, embedded in the surface and embedded beneath the surface of the substrate. The location of the phosphorus is somewhat dependent on the action of the solvent and reaction conditions on the surface.

The phosphorus-treated substrate is thereafter subjected to a bath containing a solution of a metal salt or a complex of a metal salt, which is capable of reacting with the phosphorus to form a metal phosphide. The term metal phosphide, as used herein, means the metal-phosphorus coating which is formed at the surface of the substrate. Without being limited to theory, the metal phosphide may be an ionic compound or a solution (alloy). The metals generally employed are those of Groups IB, IIB, IVB, VB, VIB, VIIB, and VIII of the Periodic Table appearing on pages 60–61 of *Lange's Handbook of Chemistry* (Revised Tenth Edition). The preferred metals are copper, silver, gold, chromium, cobalt, nickel, palladium, and the like. Some useful metal salts include copper sulfate, copper chloride, silver nitrate, nickel sulfate and nickel chloride.

The metal salts can be complexed with a complexing agent that produces a solution having a basic pH (>7). Particularly useful are the ammoniacal complexes of the metal salts, in which one to six ammonia molecules are complexed with the foregoing metal salts. Typical examples include $NiSO_4 \cdot 6NH_3$, $NiCl_2 \cdot 6NH_3$, and the like. Other useful complexing agents include quinoline, amines and pyridine. Useful complexes include compounds of the formula $MX_2Q_2$, wherein M is the metal ion, X is chlorine or bromine and Q is quinoline. Typical examples include: $CoCl_2Q_2$, $CoBr_2Q_2$, $NiCl_2Q_2$. Also useful are the corresponding monoquinoline complexes such as $CoCl_2Q$. Useful amine complexes include the mono-(ethylenediamine)-, bis-(ethylenediamine)-, tris-(ethylenediamine)-, complexes of salts such as copper sulfate. Typical pyridine complexes include $NiCl_2(py)_2$ and $CuCl_2(py)_2$ where py is pyridine.

The foregoing metal salts and their complexes are useful in ionic media, preferably in aqueous solutions. However, nonaqueous media can be employed such as alcohols, for example, methyl alcohol, ethyl alcohol and the like; cyclic ether, for example, tetrahydrofuran, dioxane, and the like. Mixtures of alcohol and water can be used. Also useful are ionic mixtures of alcohol with other miscible solvents. The solution concentration is generally in the range from about 0.1 weight percent metal salt or complex based on the total weight of the solution up to a saturated solution, preferably from about one to about ten weight percent metal salt or complex. The pH of the metal salt or complex solution can range from about 4 to 14 but is generally maintained in the basic range, i.e., greater than 7.0 and preferably from about 10 to about 13.

The step of subjection the phosphorus-treated substrate to the solution of metal salt is generally conducted at a temperature below the softening point of the substrate, and below the boiling point of the solvent, if one is used. Generally, the temperature is in the range of about 10° to about 110° centigrade, preferably from about 20° to 100° centigrade. The time of contact can vary considerably, depending on the nature of the substrate, the characteristics of the metal salts employed and the contact temperature. However, the time of contact is generally in the range of about 0.1 to 30 minutes, preferably about 5 to 10 minutes.

The treated substrates that result from contacting the phosphorus-treated article with a metal salt solution can be subjected to a process that has become known in the art as electroless plating or chemical plating. In a typical electroless plating process, a catalytic surface is contacted with a solution of a metal salt under conditions in which the metallic ion of the metal salt is reduced to the metallic state and deposited on the catalytic surface. The treated substrates of the invention that are conductive can be electroplated by processes known in the art. The conductive plastic article is generally used as a cathode. The metal desired to be plated is generally dissolved in an aqueous bath, although other media can be employed.

It has been determined that the quality of the metal phosphide, as defined hereinbefore, and of the electroplated article can be substantially affected by the amount of time the substrate is exposed to the air between the phosphorus solution and the metal salt solution. When exposed to the atmosphere, the deposited phosphorus begins to oxidize. It has now been determined that there is an optimum amount of air exposure.

If exposure to the air is too short or too long, i.e., if there is too little or too much oxidation, the adhesion and thermocyclic properties of the final electroplate diminishes. This effect becomes greater as the concentration of phosphorus employed increases.

The degree of oxidation desirable for maximum adhesion varies depending on the substrate, phosphorus solution concentration, composition of the covering phase and the like. However, in general, the most beneficial results are obtained when the phosphorus is allowed to oxidize for greater than about 5 seconds and not more than about 40 seconds, preferably about 10 to about 20 seconds. Thus, for optimum adhesion and thermocycling properties, the treated article must be transferred from the phosphorus solution to the metal salt solution in more than 5 but less than 40 seconds. On a large or commercial scale, these transfer times are difficult to achieve. It has also been observed that the phosphorus treated surface undergoes a change in character. Immediately upon removal from the phosphorus bath, the surface is hydrophobic. As the embedded phosphorus oxidizes, the surface becomes hydrophillic. If the phosphorus-treated article is allowed to become hydrophillic and then subjected to water or an aqueous solution of a surfactant, the surface of the article obtains a protective coating which substantially halts the oxidation process and allows the transfer time between baths to take on a less critical nature.

In order to obtain the optimum adhesion and thermocycling properties of the plated article, and to eliminate the effect of transfer time between phosphorus and metal salt baths, a preferred process would be to subject the article to the phosphorus bath, expose the article to air for between about 5 to about 40 seconds and then subject the thus-treated article to water or an aqueous solution of a surfactant. One preferred embodiment in copending application Ser. No. 759,531 is the employment of a separate bath containing water or an aqueous solution of a surfactant. It is not practical, however, to employ such a bath on a mechanized or commercial scale because the transfer time between the phosphorus bath and the separate water bath is at least about 1 minute. Thus, before the hydrophillic surface can be subjected to the water, too much oxidation has occurred. It is now been found that the preferred process can be effected by employing the water or aqueous surfactant layer on the phosphorus solution twice. This is accomplished by subjecting the article to the phosphorus solution, followed by withdrawing the article through the aqueous layer into the air, allowing the article to remain in the air for about 5 to about 40 seconds and thereafter returning the article to the aqueous layer on top of the phosphorus bath. The thus-treated article is reimmersed in the aqueous phase for about 1 to about 30 seconds, preferably about 4 to about 6 seconds. The article is then transferred to the metal salt solution and the amount of time required for such transfer is no longer of such immediate concern.

The following examples serve to illustrate the invention but are not intended to limit it. Unless specified otherwise in this specification and claims, all temperatures are in degrees centigrade and all parts are understood to be expressed in parts by weight. The adhesion of the plated metal of the substrate is reported in pounds per inch, which represents the quantity of force required to pull an inch wide strip of metal away from the surface. Thermostability of the plated articles was measured by a "thermocycling" test, wherein the metal plated article was subjected to the following conditions. Each cycle consisted of heating the article in an oven at 180° Fahrenheit for 30 minutes, maintaining the article at room temperature for 30 minutes and then placing it in a freezer at −40° Fahrenheit for 30 minutes. To pass each cycle, the coating cannot blister, crack or peel.

EXAMPLE 1

A polypropylene sample was immersed in a 60° trichloroethylene bath for 2 minutes to degrease the surface and then transferred to a 2.0 percent solution of yellow phosphorus in trichloroethylene being maintained at 55° centigrade and which had a layer of 2-aminoethanol-water on the surface of the trichloroethylene. After 2 minutes in the phosphorus solution, the samples were withdrawn into the air for 30 seconds and then placed back into the 2-aminoethanol-water for 4 seconds. Thereafter, the sample was immersed for 10 minutes in a 70° centigrade bath containing 190 milliliters of 2M $NiSO_4 \cdot 6H_2O$, 1276.0 milliliters of 4M ethylene diamine, 420 milliliters of 10M NaOH and sufficient water to yield a volume of 7 liters. The sample was washed with water and oven dried in an 85° oven for 30 minutes.

An acid electroless nickel bath was prepared with 90 grams of $NiCl_2 \cdot 6H_2O$, 30 grams of sodium citrate, 30 grams of sodium hypophosphite, sufficient water to yield a volume of 3 liters and sufficient $H_2SO_4$ to obtain a pH of 4.5. The plastic sample was subjected to a 5 percent aqueous sodium hypophosphite solution for 5 minutes at 66° centigrade and then to the acid electroless nickel bath for 5 minutes at 75° centigrade. Thereafter, the sample was electroplated with nickel and copper to provide an adherent metal coating on the treated surface.

EXAMPLE 2

Numerous polypropylene samples were degreased in a 60° centigrade trichloroethylene bath and then transferred to a 0.75 percent solution of yellow phosphorus in trichloroethylene maintained at 55° centigrade and which had a layer of 2-aminoethanol-water on the surface of the trichloroethylene. After 2 minutes in the phosphorus solution and 2.5 minutes in the water phase, the samples were withdrawn into the air for different periods of time and then placed back into the 2-aminoethanol-water for 4 seconds. Some samples were not double-dipped and were exposed to the air for 60 seconds before being subjected to the metal salt bath. Thereafter, the samples were immersed for 10 minutes in a 70° centigrade bath containing an ethylene diamine complex of nickel chloride and electroplated as follows: about 0.8 mil of semibright nickel was applied to the preplated plastic surfaces by employing the plastic samples as the cathode, and using a nickel anode, in a bath of a Harshaw Chemical Company Perflow semibright nickel plating solution at 65° centigrade and a current density of 4 amperes per square foot for 2 minutes, and 50 amperes per square foot for about 30 minutes. Then about 0.3 mil of bright nickel was applied to the plated surfaces by employing the samples as the cathode, and using a nickel anode in a bath of Harshaw Chemical Company Airglow bright nickel plating solution, at 65° centigrade and a current density of 50 amperes per square foot for 10 minutes. Then the nickel plated articles were coated with 0.01 mil of chrome by using the disk as the cathode and an inert anode in a Udylite K2–50 chromic acid plating bath. A current density of 150 amperes per square foot was employed for 1.5 minutes. The amount of time between removal from the 2-aminoethanol-water phase until reimmersion in that phase and the resulting average adhesion is given in Table I.

TABLE I

| Seconds in Air | Average Adhesion |
|---|---|
| 3 | 29.2 |
| 5 | 34.5 |
| 10 | 31.4 |
| 15 | 31.6 |
| 25 | 31.4 |
| 35 | 33.0 |
| 60 | 25.6 |

EXAMPLE 3

Polypropylene samples were degreased for 2 minutes in trichloroethylene at 60° centigrade, immersed in a solution of phosphorus in trichlorethylene at 55° centigrade for 3 minutes, and were withdrawn into a phase covering the phosphorus solution, which phase was 0.164 molar in ethanolamine at 55° centigrade for 5 minutes. The samples were withdrawn into the air and then returned to the covering phase for 0.1 minute. Thereafter, the samples were immersed in a bath containing an ethylenediamine complex of nickel chloride at 70° centigrade for 15 minutes, washed with water, dried in air for 30 minutes at 85° centigrade and electroplated as described in Example 1. Transfer times between successive baths were each 1 minute except for the time between the two covering phase immersions. The latter times, concentration of the phosphorus in solution (in weight percent) and resulting adhesion of the electroplated samples (average) are given in Table II.

Table II

| Phosphorus Concentration | Time, Seconds | Adhesion |
|---|---|---|
| 0.5 | 10 | 34.5 |
| 0.5 | 30 | 31.5 |
| 1.0 | 10 | 30.2 |
| 1.0 | 30 | 24.8 |

The foregoing demonstrates that as the amount of oxidation increases, the adhesion decreases and that the most beneficial length of time the substrate is allowed to oxidize varies depending on the concentration of elemental phosphorus in solution.

EXAMPLE 4

Polyvinylchloride sheets were immersed for 3 minutes in a treating bath comprised by a 2 weight percent solution of yellow phosphorus dissolved in a mixture of 25 volume percent trichlorethylene and 75 volume percent perchloroethylene and maintained at 60° centigrade and having a layer containing 60 weight percent dimethyl-formamide in water on the surface thereof. The plastic sheets were withdrawn from the treating bath, held in the air for 10 seconds and then reimmersed in the aqueous dimethylformamide layer for 4 seconds. Thereafter, the treated plastic sheets were immersed for 10 minutes in an ammoniacal solution of 5 weight percent nickel sulfate dissolved in water and maintained at 60° centigrade. The resulting nickel phosphide coated sheets were water-washed, dried in an oven and then metal plated as in Example 2. The resulting metal plated plastic sheets had adherently bound metal coatings thereon.

Other ammoniacal metal salts are readily employed in the foregoing process such as copper sulfate, copper chloride and silver nitrate.

EXAMPLE 5

Articles molded from Cycolac EP-3510 ABS resin, a graft copolymer of polybutadiene, styrene and acrylonitrile, were subjected to the process of Example 4 to yield articles having adherently bound metal coatings.

Articles having adherently bound metal phosphides are obtained by employing the process of Example 5 with the following substrates: polyethylene, polycarbonate, wood, cardboard, leather, asbestos, cement and unglazed porcelain.

EXAMPLE 6

A polypropylene molded disk was immersed in a treating bath comprised of a 2 weight percent solution of yellow phosphorus dissolved in trichloroethylene and maintained at a temperature of 68° centigrade and having on the surface of the solution a solution of 60 weight percent dimethylformamide in water of an equal depth. After 2 minutes in the phosphorus phase, the plastic article was withdrawn into the air for 20 seconds and thereafter reimmersed in the aqueous dimethylformamide solution for 6 seconds. The resulting phosphorus-treated polypropylene disk was then immersed for 15 minutes in an ammoniacal solution of 5 weight percent nickel chloride dissolved in water and maintained at a temperature of 35° centigrade. The resulting plastic article coated with a nickel phosphide alloy was rinsed with cold water and dried in an oven. The coated plastic article had a shiny, strongly adherent nickel phosphide alloy coating which could not be scratched from the surface of the plastic.

Similar results are obtained when the aqueous dimethylformamide is replaced by a surfactant or aqueous solution thereof such as 10 percent potassium hydroxide, 1 percent potassium hydroxide, 2 percent sodium hydroxide, 2 percent sodium carbonate, 2 percent sodium bicarbonate, 2 percent sodium sulfate, octylphenoxypoly(ethyleneoxy), sodium lauryl sulfate, dicoco dimethyl ammonium chloride, ethanol, and glycerol.

EXAMPLE 7

Numerous polypropylene disks were degreased by immersion in trichloroethylene for 2 minutes at 60° centigrade. Thereafter, the disks were immersed into a 2.5 percent yellow phosphorus in trichloroethylene solution maintained at 55° centigrade for 8 minutes. The phosphorus solution had an aqueous ammonium hydroxide layer thereon maintained at a pH of 10.5 and a temperature of 55° centigrade. The disks were raised into the ammonium hydroxide layer for 5 minutes and then into the air for varying lengths of time. Thereafter, the disks were reimmersed in the aqueous ammonium hydroxide layer for about 4 seconds. Thereafter, the thus-treated samples were immersed in an ammoniacal nickel sulfate bath at 70° centigrade for 15 minutes. Thereafter, the samples were subjected to a 3.5 pH HCl bath for 10 minutes at 55° centigrade, oven dried for 30 minutes at 85° centigrade and electroplated as described in Example 2. Transfer times between the various treatments were 1 minute. The time between the initial subjection to the aqueous ammonium hydroxide layer and the reimmersion therein, and the resulting average adhesion are given in Table III.

TABLE III

| Air Exposure | Average Adhesion |
|---|---|
| 5 | 39.5 |
| 10 | 37.7 |
| 30 | 35.0 |

22 of the foregoing treated disks were subjected to the thermocycle test described hereinbefore. All disks passed six cycles.

Various changes and modifications can be made in the process and treating baths of this invention without departing from the spirit and the scope of the invention. The various embodiments of the invention disclosed herein serve to illustrate the invention but are not intended to limit it.

We claim:

1. A process which comprises contacting a substrate with a solution of white phosphorus dissolved in an organic solvent; washing said substrate with at least one medium of the group of water, a surfactant or aqueous solution thereof; contained as an upper layer or phase on the surface of said white phosphorus/organic solvent solution; exposing said substrate to the atmosphere for about 5 to about 40 seconds; returning said substrate to said upper layer or phase; and thereafter contacting said substrate with a metal salt or complex thereof so as to form a metal phosphite, Wherein said metal is selected from Groups IB, IIB, IVB, VB, VIB, VIIB and VIII of the Periodic Table.

2. The process of claim 1 wherein said medium is water.

3. The process of claim 1 wherein said medium is an aqueous solution of a surfactant.

4. The process of claim 3 wherein said surfactant is a 2-aminoethanol.

5. The process of claim 3 wherein said surfactant is dimethylformamide.

6. The process of claim 3 wherein said surfactant is sodium carbonate.

7. The process of claim 1 wherein said organic solvent is trichloroethylene and said metal is nickel.

8. The process of claim 7 wherein said substrate is polypropylene.

9. The process of claim 7 wherein said substrate is polyethylene.

10. The process of claim 7 wherein said substrate is a graft copolymer of polybutadiene, styrene and acrylonitrile.

11. The process of claim 1 wherein the resulting treated substrate is thereafter subjected to electroless metal plating to deposit an electroless conductive coating on the substrate.

12. The process wherein the substrate resulting from the process of claim 11 is electroplated to deposit an adherent metal coating on the electroless conductive coating.

13. The process wherein the substrate resulting from the process of claim 1 is electroplated to deposit an adherent metal coating on the treated substrate.

14. The process wherein the plastic resulting from the process of claim 1 is electroplated to deposit an adherent metal coating on the treated plastic.

* * * * *

PO-1050
(5/69)

UNITED STATES PATENT OFFICE
CERTIFICATE OF CORRECTION

Patent No. 3,642,585 Dated February 15, 1972

Inventor(s) Kingso C. Lin, Edward J. Quinn and John K. MacKay

It is certified that error appears in the above-identified patent and that said Letters Patent are hereby corrected as shown below:

Column 4, line 46, "subjection" should read ---subjecting---. Column 5, line 43, "It is now" should read ---It has now---. Column 7, line 47, "60°" should read ---65°---. Column 8, line 70, "Wherein" should read ---wherein---.

Signed and sealed this 27th day of June 1972.

(SEAL)
Attest:

EDWARD M.FLETCHER,JR.
Attesting Officer

ROBERT GOTTSCHALK
Commissioner of Patents